UNITED STATES PATENT OFFICE.

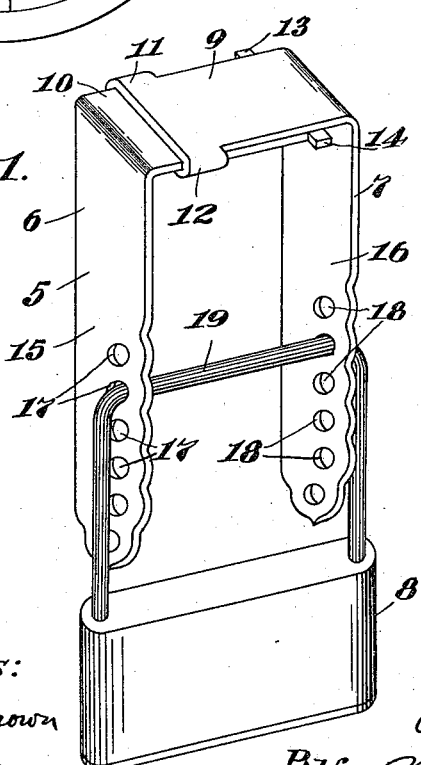

CHARLES W. STURR, OF CINCINNATI, OHIO.

AUTOMOBILE-LOCK.

1,218,013.   Specification of Letters Patent.   Patented Mar. 6, 1917.

Application filed May 28, 1915. Serial No. 31,046.

*To all whom it may concern:*

Be it known that I, CHARLES W. STURR, a citizen of the United States of America, and resident of Cincinnati, county of Hamilton, State of Ohio, have invented certain new and useful Improvements in Automobile-Locks, of which the following is a specification.

This invention relates to improvements in locks for automobiles and particularly to improvements in that class of locks which are adapted to be applied to the spark and throttle control levers of an automobile.

An object of my invention is to produce an improved lock for the throttle and spark control levers of an automobile, in which the levers are locked to the steering wheel to prevent displacement from their shut off positions.

A further object is to produce an improved lock for the spark and throttle levers of automobiles, which is adjustable for the purpose of application to any of the standard makes of cars having their spark and throttle control levers arranged in the manner shown in the accompanying drawings.

These and other objects are attained in the automobile lock described in the following specification and illustrated in the accompanying drawings in which;

Figure 1 is an enlarged perspective view of a lock embodying my invention.

Fig. 2 is a fragmental elevational view of an automobile steering column having the spark and throttle control levers secured against movement from their shut off positions by means of my improved lock.

Fig. 3 is a fragmental plan view upon a somewhat reduced scale, of an automobile steering column having the throttle and spark control levers locked against movement by means of a lock embodying my invention.

Fig. 4 is a sectional view upon a slightly enlarged scale taken on the line 4—4 of Fig. 3.

The lock embodying my invention comprises an expansible U-shaped lock bar 5 consisting of an L-shaped portion 6 and a similarly shaped portion 7 adapted to adjustably coöperate with one another, and a lock 8. Each of the members 6 and 7 of the lock bar 5 are L-shaped, the shorter portions 9 and 10 being adapted to slidingly engage one another for the purpose of rendering the bar adjustable for various sizes of control levers and steering wheel arms which would be encountered in the various makes of automobiles. For the purpose of holding the portions 9 and 10 in sliding engagement with one another, the portion 9 is provided with tongues 11 and 12 adapted to be bent around and into engagement with the under face of the portion 10 so that the tongues form guides for the portion 10. In order to prevent displacement of the portion 10 from the portion 9, lugs 13 and 14 have been formed on the portion 10 so that when the portions 9 and 10 are moved to expand the bar, the lugs will be brought into engagement with the tongues, thereby limiting the motion of the members. The downwardly extending portions 15 and 16 of the respective members 6 and 7 of the lock bar are provided with a series of apertures 17 and 18 formed in the respective members, for the purpose of receiving the hasp 19 of the padlock 8. The series of apertures are provided for the purpose of permitting the hasp 19 to be locked in the proper apertures for the purpose of adapting the lock to use on cars of various designs, so that together with the adjustability of the members 6 and 7 with relation to one another, the lock may be used on any car having the throttle and spark control levers located in the positions shown in the drawings.

In using the lock embodying my invention the U-shaped lock bar 5 is dropped down over the throttle and spark control levers and over one of the arms 20 of the steering wheel 21 as well as over one of the arms 22 of the segment 23, as shown in the drawings, in which position the members 6 and 7 are brought toward one another to bring the control levers and the arm in alinement. It is obvious that instead of dropping the lock bar over said members it may be brought up from below them. The hasp 19 of the lock 8 is then passed through the apertures 17 and 18 of the legs 15 and 16, which are located nearest to the under face of the arm 20 embraced by the lock bar. With the hasp in this position the lock is locked thus preventing displacement of the lock bar and consequently preventing displacement of the throttle and spark control levers from their shut off positions.

Having thus described my invention, what I claim is;

1. In a lock for automobiles the combination of a substantially U-shaped lock bar adapted to embrace the throttle and spark control levers and an arm of the steering wheel of the vehicle, and means adapted to lock the lock bar in position, said bar consisting of portions adapted to be adjusted relatively to one another to embrace control levers and steering wheel arms of varying dimensions.

2. In combination in an automobile lock, a substantially U-shaped lock bar having a series of apertures in each of its legs, said bar consisting of portions adapted to be adjusted relatively to one another to embrace the spark and throttle control levers and an arm of the steering wheel of an automobile, and means adapted to engage the proper apertures to hold the spark and throttle levers against displacement.

3. A lock for automobiles comprising a substantially U-shaped lock bar adapted to engage the spark and throttle levers and an arm of the steering wheel of an automobile, said bar consisting of relatively adjustable members, each of said members having a portion adapted to coöperate with the corresponding portion of its coöperating member, means formed on said portions adapted to hold the portions in sliding engagement and to prevent their displacement relatively to one another, the parts of the members forming the legs of the lock bar having a series of apertures formed therein, and a lock adapted to engage the proper apertures in the legs to prevent removal of the lock bar from the levers and the arm of the steering wheel.

4. In a lock for automobiles the combination of a substantially U-shaped lock bar adapted to engage the spark and throttle levers and an arm of the steering wheel of an automobile, said bar consisting of relatively adjustable L-shaped members, one of said members having tongues formed thereon adapted to engage the other member and to permit relative sliding movement of the members, and lugs formed on the other member adapted to engage the tongues on the first mentioned member to prevent displacement of the members, the parts of the members forming the legs of the lock bar having means adapted to engage a lock.

In testimony whereof, I have hereunto subscribed my name this 27th day of May, 1915.

CHARLES W. STURR.

Witnesses:
WALTER F. MURRAY,
W. THORNTON BOGERT.

Copies of this patent may be obtained for five cents each, by addressing the "Commissioner of Patents, Washington, D. C."